United States Patent
Steiger

(10) Patent No.: US 7,375,623 B2
(45) Date of Patent: May 20, 2008

(54) METHOD FOR MONITORING AT LEAST ONE SENSOR

(75) Inventor: Eckard Steiger, Suttgart (DE)

(73) Assignee: Robert Bosch GmbH, Stuttgart (DE)

( * ) Notice: Subject to any disclaimer, the term of this patent is extended or adjusted under 35 U.S.C. 154(b) by 117 days.

(21) Appl. No.: 10/523,313

(22) PCT Filed: Mar. 12, 2003

(86) PCT No.: PCT/DE03/00779

§ 371 (c)(1),
(2), (4) Date: Sep. 26, 2005

(87) PCT Pub. No.: WO2004/018972

PCT Pub. Date: Mar. 4, 2004

(65) Prior Publication Data
US 2006/0155426 A1    Jul. 13, 2006

(30) Foreign Application Priority Data
Aug. 1, 2002    (DE) .............................. 102 35 163

(51) Int. Cl.
*B60Q 1/00* (2006.01)
(52) U.S. Cl. ........................................ 340/438; 701/29

(58) Field of Classification Search ................ 340/438; 700/79; 701/29; 702/182
See application file for complete search history.

(56) References Cited

U.S. PATENT DOCUMENTS

| | | | |
|---|---|---|---|
| 5,422,965 A | 6/1995 | Bekki et al. | |
| 5,440,487 A * | 8/1995 | Althoff et al. | 701/43 |
| 5,723,858 A | 3/1998 | Sugden | |
| 6,244,675 B1 | 6/2001 | Behrends et al. | |
| 6,704,628 B1 * | 3/2004 | Fennel et al. | 701/29 |
| 7,162,312 B2 * | 1/2007 | Gross et al. | 700/79 |

FOREIGN PATENT DOCUMENTS
DE      100 62 839      1/2002

* cited by examiner

*Primary Examiner*—John Tweel, Jr.
(74) *Attorney, Agent, or Firm*—Keyon & Kenyon LLP

(57) ABSTRACT

A method for monitoring at least one sensor is provided. In this context, error words are transmitted from the sensor to the control unit and additional different information characterizing error images is used to enable an adapted response to these parameters by the processor. Extraordinary operating states are indicated in this context in addition to errors. The different error images are recorded in the control unit application phase and result in error image-specific system reactions via a look-up table.

5 Claims, 2 Drawing Sheets

METHOD FOR MONITORING AT LEAST ONE SENSOR

CROSS-REFERENCE TO RELATED APPLICATIONS

The present application is a national-phase application under 35 U.S.C. §371, based on PCT Application No. PCT/DE03/00779 filed on Mar. 12, 2003, and the present application claims the priority benefit under 35 U.S.C. §120 of German Patent Application No. 10235163.5 filed on Aug. 1, 2002.

FIELD OF THE INVENTION

The present invention relates to a method for monitoring at least one sensor.

SUMMARY

The method of the present invention for monitoring at least one sensor has the advantage that a reaction adapted to an error pattern having a certain error message may occur, and that each sensor error is prevented from resulting in the sensor signal not being able to be used or in the system identifying a permanent sensor error and consequently a system defect. As a result, interference that does not signify lasting sensor damage and may even be attributed to rare yet possible operating states is not penalized too strictly. Examples of this are electromagnetic interference coupling and hammer blow-related vibrations. This improves the operability or sensitivity of the systems and reduces the probability of control unit field outage. In particular, the present invention renders it possible for the particular target control unit and vehicle to better address the different system requirements or customer requirements with respect to activation parameters and error management.

Consequently, the performance and robustness of the entire system are increased, and the field outage rates are reduced since as a result of the more in-depth error pattern detection, total sensor failure is not detected for all error patterns. In addition, the present invention is advantageous because error detection and optimization are facilitated in the restraint system development and testing phase. However, use of the present invention is also possible and practical in other automobile application areas in which sensors are used, in particular in vehicle dynamics control and navigation.

It is particularly advantageous for the parameters from which the error pattern is formed to include at least one error message and/or a time duration of the at least one error message or error and/or at least one sensor signal of the sensor to be checked and/or at least one additional sensor signal of at least one additional sensor and/or at least one status signal of a vehicle component. This allows exact analysis of the error which may be corrected, e.g., using a look-up table. The error pattern is generated using the look-up table in the processor of the control unit and may then be evaluated accordingly. In particular, it is consequently possible for the control unit to detect whether the error is a permanent error and how significant the error is.

It is particularly advantageous that a rotation-rate sensor is used in which an error word is transmitted in an 8-bit word, provided with the abbreviation MONI in this case, in a 16-bit frame. In this context, the error type or modes are characterized in this word by flags. Therefore, different detected error modes and extraordinary operating states are indicated by this word. Error modes indicate that at least one sensor parameter is outside of a predefined range. The sensor parameters are monitored inside the sensor. The word MONI may be accordingly assigned information doubly or multiply via two or more different MONI read commands.

If during such a monitoring operation an error is detected, a respective value is set in a respective register. This means that an error register is assigned a logical 1. If this error is no longer detected, the respective register is reset. Therefore, a logical 0 is set again.

It is also advantageous that the sensor itself is positioned within the housing of the control unit. The sensor and the processor of the control unit may then be connected to one another via the digital interface and SPI (serial peripheral interface) lines, respectively, for example.

DETAILED DESCRIPTION

Figure 1:
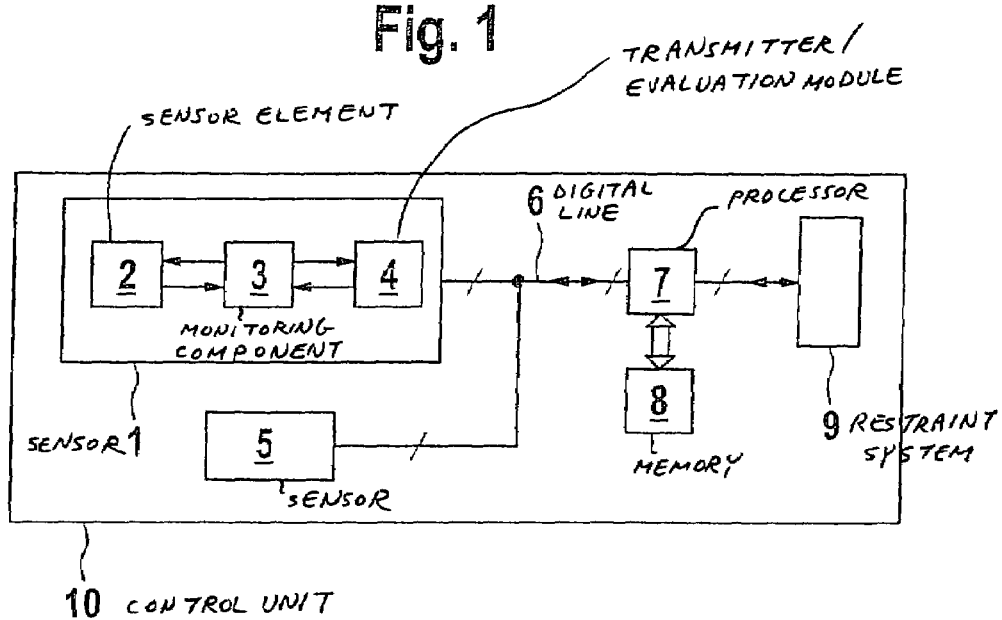
FIG. 1 shows a block diagram of the control unit of the present invention.

Rotation-rate sensors, as well as other sensors, are used increasingly in electronic restraint systems for passive vehicle safety. Rotation-rate sensors are integral in the detection of rollover occurrences and related accident occurrences, e.g. the soil trip.

The rotation-rate sensors used in the restraint systems generally have an internal sensor monitoring function. In the case of analog sensor interfaces to the system, an identified error or interference state that may have a wide range of causes is communicated via a logic signal (error, no error) to a sensor platform, a control unit, generally a microcontroller, or a safety semiconductor.

Digital sensors enable a relatively simple implementation for transmitting different errors and interference states to the system via fixedly assigned bits in data words. In this context, every bit is assigned an error flag that is then assigned to a circuit block or a measured variable inside the sensor. The internal sensor monitoring function generally responds when, and as long as, one of the various monitored measured variables inside the sensor assumes a value not allowed for the corresponding sensor. The causes may vary depending on the sensor evaluation circuit function blocks.

Possible causes of interference or error states:

In the case of rotation-rate sensors used in automobile systems, principle-related vibration or mechanical interference susceptibility is a characteristic property to be taken into consideration in the sensor application. If no mechanical damping occurs, the performance of the systems is imitated. Mechanical damper construction entails significant additional development and production costs. Impacts and significant vibrations may interfere with the sensor element so significantly that internal sensor regulations are no longer effective for a certain time and the sensor operation is outside its specified function range. Further possible interference includes electromagnetic interference coupling.

Errors in the sensor itself or in the application circuit may also affect system functioning. The effects differ depending on rotation-rate sensor error, interference type, and also application environment of the sensor, e.g., the circuit, circuit board, and vehicle construction.

To date, the rotation-rate sensor monitoring function has been used on the system side only for basic error detection, i.e., to determine whether the sensor is OK. The restraint system differentiates with respect to its reaction over the time duration of the error message on the basis of whether there is a rotation-rate sensor failure. The particular system reaction is not adjusted to the different error messages.

Since there is no classification of the different error patterns on the system side and the application environment is not applied, the "worst case scenario" principle must be followed. A faulty state identified by the monitoring function results in the sensor signal not being able to be used, or in the system being identified as having a permanent sensor error and consequently a system defect. As a result, interferences that do not signify lasting sensor damage and may even be attributed to rare yet possible operating states are generally given too much significance. This limits the performance or sensitivity of the systems, or increases the probability of a possibly unnecessary control unit field outage.

Therefore, an error word transmitted from the sensor to the system, e.g., a processor of the control unit, and having a combination of different error modes, and thereby transmitting precise information regarding the error type and cause to the system, is used in accordance with the present invention. The system consequently reacts to the error word in an adapted manner.

Error patterns due to various error and interference causes may be recorded in the development and application phase of restraint system electronics systems, which makes it possible to complete a look-up table. In this context, the particular error pattern may be comprised of an error message or an error word, an error state word, a time duration of the error message, a sensor output signal, and additional sensor signals available in the system as well as status information. The availability of such a look-up table allows the system to react appropriately to the particular error pattern. Error patterns that are unknown or are not secured by testing are treated as a worst case. Consideration of the present vehicle environment allows a further increase in the detection precision of errors and interference causes.

A practical requirement for implementing the present invention is a digital sensor interface, which allows a number of different errors and interference modes or patterns and also combinations thereof that occur in a sensor to be transmitted to the system. The bi-directional SPI (serial peripheral interface) is used as an example in this instance.

FIG. 1 shows a block diagram of the control unit of the present invention. Located in a control unit 10 is a sensor 1, which is connected to a processor 7 via a digital line 6. Processor 7 is connected via a data input/output to a memory 8. Processor 7 is connected via a data output to a restraint system 9. Located in sensor 1 is a sensor element 2 for measuring a measured variable, e.g. of rotation rates or rotational accelerations. The sensor element may be a micromechanical sensor structure. Sensor element 2 is connected to a functional and monitoring component 3, in which the analog-digital conversion of the sensor signal, in some instances the drive and regulation of the sensor element, and the internal sensor monitoring functions are performed.

Functional and monitoring component 3 is connected via a data output to a transmitter component 4. Transmitter component 4 is connected to digital line 6, which is configured here as an SPI (serial peripheral interface) line. One or more sensors 5, the signals of which are transmitted via the SPI and are also applied to the error pattern, may also be connected to the SPI.

Figure 4:
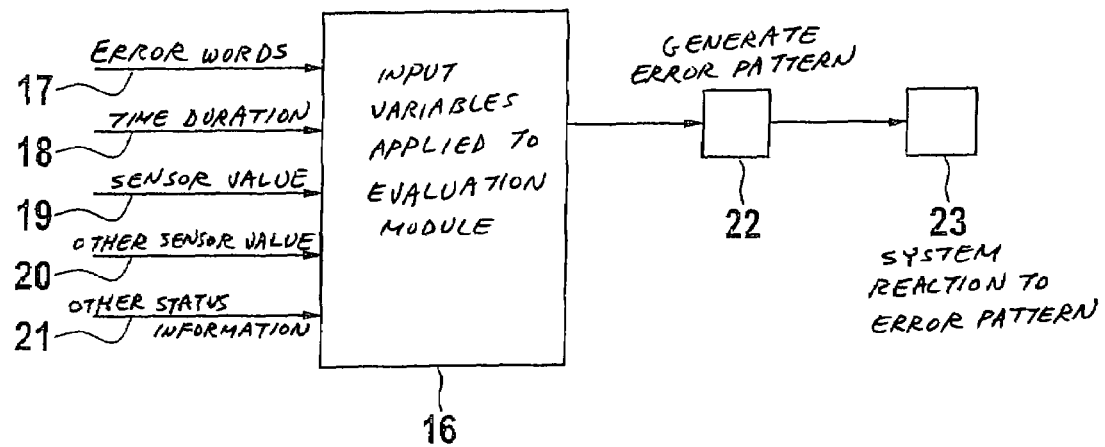
FIG. 4 shows a block diagram of the method of the present invention.

FIG. 4 shows the method steps by which measured values are processed. Specific rotation-rate sensor error words 17 transmitted as 8-bit words are used to generate the error pattern. A variable 18 provides the particular time duration of the individual error messages. A variable 19 provides the sensor value determined via sensor element 2. This is also monitored for operability. A variable 20 may be used to process the variables from other sensors 5. They may also provide a type of plausibility for the error message. Variable 21 provides other status information regarding the restraint system or other vehicle components. These are also applied to the error pattern generation. These input variables are then applied in function block 16 to the transmitter component (evaluation module) 4, which utilizes a stored look-up table, i.e. a matrix, to generate an error pattern. The input parameters determine the rows and columns of the matrix and then result in the generation of the error pattern in function block 22, the system then reacting to this error pattern in function block 23 after transmission to processor 7. Processor 7, via its memory 8, decodes the error pattern so that it is clear to processor 7 which errors caused this error pattern. If there are error patterns that are not known to processor 7, a worst case is assumed, i.e., sensor failure. As a function of this, the processor detects failure of the subsystem affected by this sensor failure and introduces corresponding measures.

Figure 3:
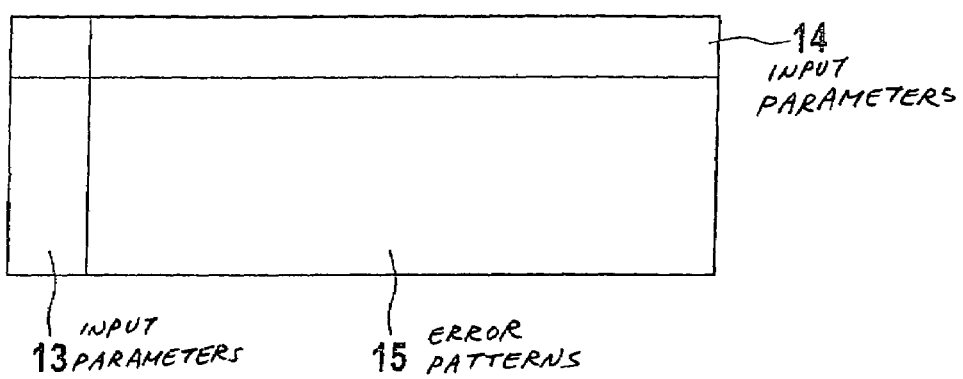
FIG. 3 shows a look-up table.

FIG. 3 schematically shows an example of a matrix designated here as the look-up table. The input parameters are in columns 14 and 13 and the error patterns that correspond to these input parameters are then in field 15.

Figure 2:
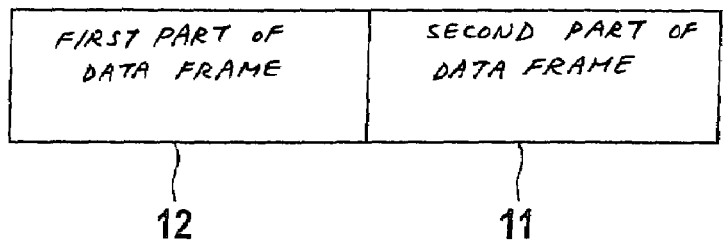
FIG. 2 shows a data format used in the present invention.

FIG. 2 schematically shows a data frame of 16 bits, which frame is divided into a first part 12 and a second part 11. Error word (MONI) is transmitted in second part 11, or two error words may be transmitted here. A first error word is read out via a first read command, and a second error word is read out via a second read command.

Figure 5:
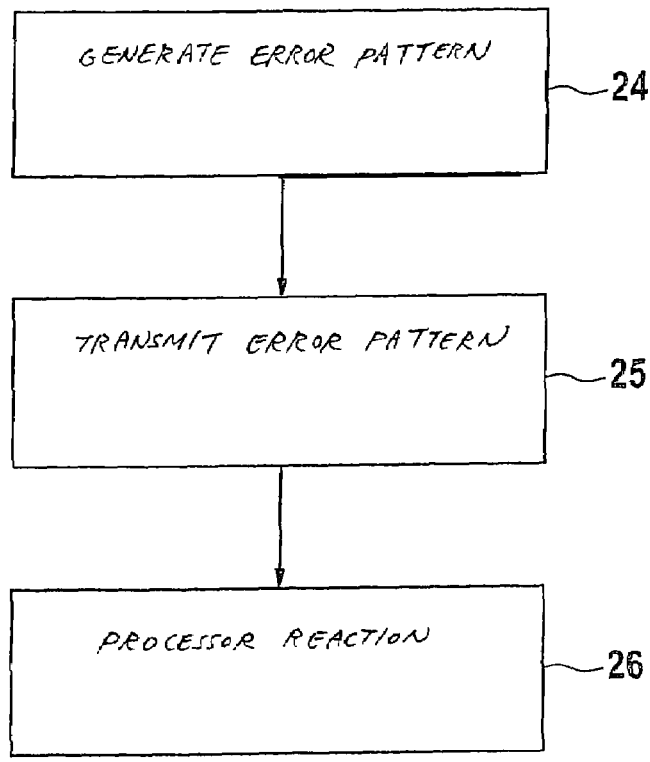
FIG. 5 shows a flow chart of the method of the present invention.

FIG. 5 shows a flow chart of the method of the present invention. As shown above, the error pattern is generated in method step 24 on the basis of input parameters 17 through 21 input in function block 16 (in FIG. 4) using a look-up table shown in FIG. 3. The error pattern is then transmitted in method step 25 to processor 7. The processor reacts to this error pattern in method step 26.

Sensor 1 may alternatively be located outside of control unit 10. Instead of only one sensor 1, a plurality of sensors of different types may also be used and monitored. In addition to the restraint system addressed here, other vehicle systems are also suitable for this invention, e.g. a vehicle dynamics system or navigation system, which may be presented by element 9 (restraint system in the example embodiment) in FIG. 1.

What is claimed is:

1. A method for monitoring at least one sensor, comprising:
   forming an error pattern for a monitoring of the at least one sensor with the aid of an error word and at least one of a sensor signal and a status signal of a vehicle component, wherein the error pattern is formed by an evaluation module associated with the sensor using a stored look-up table, and wherein the error word indicates one of a plurality of different error types;

transmitting the error pattern from the evaluation module to a processor; and evaluating the error pattern by the processor to form one of plurality of responsive measures depending on the error pattern.

2. The method as recited in claim 1, wherein the error pattern is formed with the aid of the error word and sensor signals of at least two sensors.

3. The method as recited in claim 1, further comprising:

evaluating by the processor the sensor signal of the sensor as a function of the error pattern.

4. The method as recited in claim 3, wherein the sensor signal is applied to a restraint system.

5. The method as recited in claim 3, wherein the sensor signal is supplied to one of a vehicle dynamics system and a navigation system.

* * * * *